United States Patent [19]

Goleman

[11] 4,028,688
[45] June 7, 1977

[54] REFRIGERATION UNIT AIR TEMPERATURE DETECTION ALARM SYSTEM

[76] Inventor: Joel B. Goleman, 607 Chelten Hills Drive, Elkins Park, Pa. 19117

[22] Filed: Oct. 10, 1975

[21] Appl. No.: 621,354

Related U.S. Application Data

[63] Continuation-in-part of Ser. No. 353,340, April 23, 1973.

[52] U.S. Cl. ............................. 340/227.1; 340/224
[51] Int. Cl.² ......................................... G08B 21/00
[58] Field of Search ......................... 340/227.1, 224

[56] References Cited

UNITED STATES PATENTS

| | | | |
|---|---|---|---|
| 2,741,099 | 4/1956 | Beane | 340/227.1 |
| 2,923,786 | 2/1960 | Jones | 340/227.1 |
| 3,028,586 | 4/1962 | Reda | 340/227.1 |
| 3,148,363 | 9/1964 | Gjerken | 340/227.1 |
| 3,196,286 | 7/1965 | Darack | 340/227.1 |
| 3,852,740 | 12/1974 | Haymes | 340/224 |

Primary Examiner—Marshall M. Curtis
Attorney, Agent, or Firm—Dorfman, Herrell and Skillman

[57] ABSTRACT

A compact alarm system is provided by a temperature sensing switch within a refrigeration unit, the temperature of which actuates the switch when temperature rises to a predetermined level. Change of condition of the contacts induces a pulse which triggers an integrated circuit timer. The timer imposes a predetermined delay before activating a communications linkage. No permanent wiring and, at most, only light wiring is required in the location of the refrigeration unit and wiring may be eliminated entirely by employing individual transmitters in each case. Remote alarm means provides a predetermined alarm indicating abnormal conditions in the refrigeration unit, preferably in response to a radio signal transmitted from the location proximate to the refrigeration unit. The receiver activates an automatic telephone dialer which dials pre-programmed telephone number and plays a pre-recorded message.

7 Claims, 2 Drawing Figures

REFRIGERATION UNIT AIR TEMPERATURE DETECTION ALARM SYSTEM

This application is a continuation-in-part of application Ser. No. 353,340, filed Apr. 23, 1973.

BACKGROUND OF INVENTION

The present invention relates to a system for providing an alarm message for maintenance personnel when a temperature exceeding a specified level is experienced in a refrigeration unit. In accordance with the present invention, the part of the system in the location of the refrigeration unit is compact and employs no permanent wiring. Preferably, radio transmission of an alarm signal to a remote location permits location of heavier equipment of the system in that remote location from which pre-recorded alarm messages can be transmitted.

Prior art systems have measured an inferred indication of temperature, rather than temperature itself. Such systems have employed devices which sense vacuum, freon pressure, operable time of the refrigeration compressor, motor and other portions of the refrigeration unit to determine when the refrigeration unit loses its cooling capacity. Transmitters at the location of a sensor transmitting a radio frequency signal representative of sensed information have been known. Furthermore, automatic telephone dialers responsive to a signal from a remote transmitter to dial a pre-programmed number, and a message playing unit to play a pre-programmed alarm message over the open telephone line dialed have been known. Temperature sensing switches of the type preferred by the applicant have been suggested by H. Gjerken in his U.S. Pat. No. 3,148,363, for fire alarm systems. However, the systems involved are relay systems which would be objectionable in a super market, for example, because of bulk and probably because of the requirement of making permanent wiring.

Also, monitoring systems for monitoring refrigerated display cases have been suggested in the prior art, such as by Norman B. Bergeron in U.S. Pat. No. 3,594,749. However, there is no commercial device available for this purpose. The Bergeron system is also like other known prior art in that it provides no remote signal. While Bergeron shows a plurality of systems with a central cabinet there is no suggestion of remoteness and apparently Bergeron intends that the apparatus shall be used directly at the location of the refrigeration unit. The alarm is a light which must be observed by someone, presumably either on the scene, or more likely, periodically monitoring the location.

SUMMARY OF THE INVENTION

The present invention relates to an alarm system. The alarm system is one which employs a switch device effectively employing a change of state of contact opening or closing for directly sensing air temperature in the refrigeration unit and producing an indication when the air temperature reaches or exceeds a predetermined level. Unexpectedly, it is possible for contacts of this sort to be employed with selected integrated circuit timer means responsive to such signals without a separate pulse generator and requiring little power. Circuit timer means can be provided with its own power source independent of the general power source required to operate the refrigeration unit. Being self-contained and self-powered, should the general power for the refrigeration means fail, the power for the alarm unit would still be available and the sensing and alarm system would still operate. The contacts of the temperature sensing means, as previously indicated, operate the integrated circuit without separate pulse generation means when the air temperature in the refrigeration unit reaches or exceeds the predetermined level. Similarly, change in contact condition can reset the counter, again without separate generation means, when the temperature again drops below the predetermined level.

The alarm means are remote in order to eliminate a large bulk of equipment at the site of the refrigeration unit. The alarm means always provides the same predetermined alarm message indicating an abnormal temperature condition in the refrigeration unit.

A communication linkage means is provided in series between the temperature sensing means, including the timer means, and the remote alarm means for transmitting the actuating signals to initiate the remote alarm means as soon as the timer means has determined that the temperature has remained above a predetermined level continuously for a set predetermined time. In preferred embodiments, the transmitter system can be extremely compact. Frequently, the whole sensor, counter and transmitter combination can be contained in a small package placed in or adjacent to the refrigeration unit in a way that is hardly noticeable. Even if a relatively bulky transmitter is employed, no permanent wiring is required and the transmitter may be located some distance from a given point. If a common transmitter is provided for multiple sensors, even then the wiring need not be of a heavy duty type but can be light, almost invisible wiring. The power and current levels, of course, eliminate any danger of shock. Even if a radio link is not employed, the light weight wiring required can be easily and quickly installed and will be hardly noticeable when in use.

An advantage of the present invention is that it may be constructed of a unique combination of commercially available components, unlike any other prior art systems, to provide an inexpensive, essentially foolproof system for determining when a refrigeration unit loses its cooling capacity.

Use of direct sensing of air temperature in the refrigeration unit to determine when that temperature exceeds its specified level avoids errors inherent in measuring parameters other than temperatures which may, or may not, reflect temperature changes. For example, prior art systems that sense the conditions or operation of various operable parts of the refrigeration unit may give false positive indicators, and in practice have caused substantial economic losses, when the sensed parts remain operable but other parts fail and cause the refrigeration unit to lose its cooling capacity.

Another advantage of the present invention is that the integrated circuit timer requires no separate pulse generator but derives its signal directly from the contact change of conditions. Of course, a timer defers establishment of a communication link and indication of alarm until the temperature reaches or exceeds the specified level for a specified period of time. This assures no false alarms, for example, during periodic defrosting periods of less than the specified period of time.

For a better understanding of the present invention reference is made to the accompanying drawing in which:

FIG. 1 is a functional block diagram of an air temperature sensitive alarm system; and FIG. 2 is an elevational view of a set point thermostat preferred for use with the present invention.

DESCRIPTION OF THE SPECIFIC EMBODIMENTS

Figure 1:
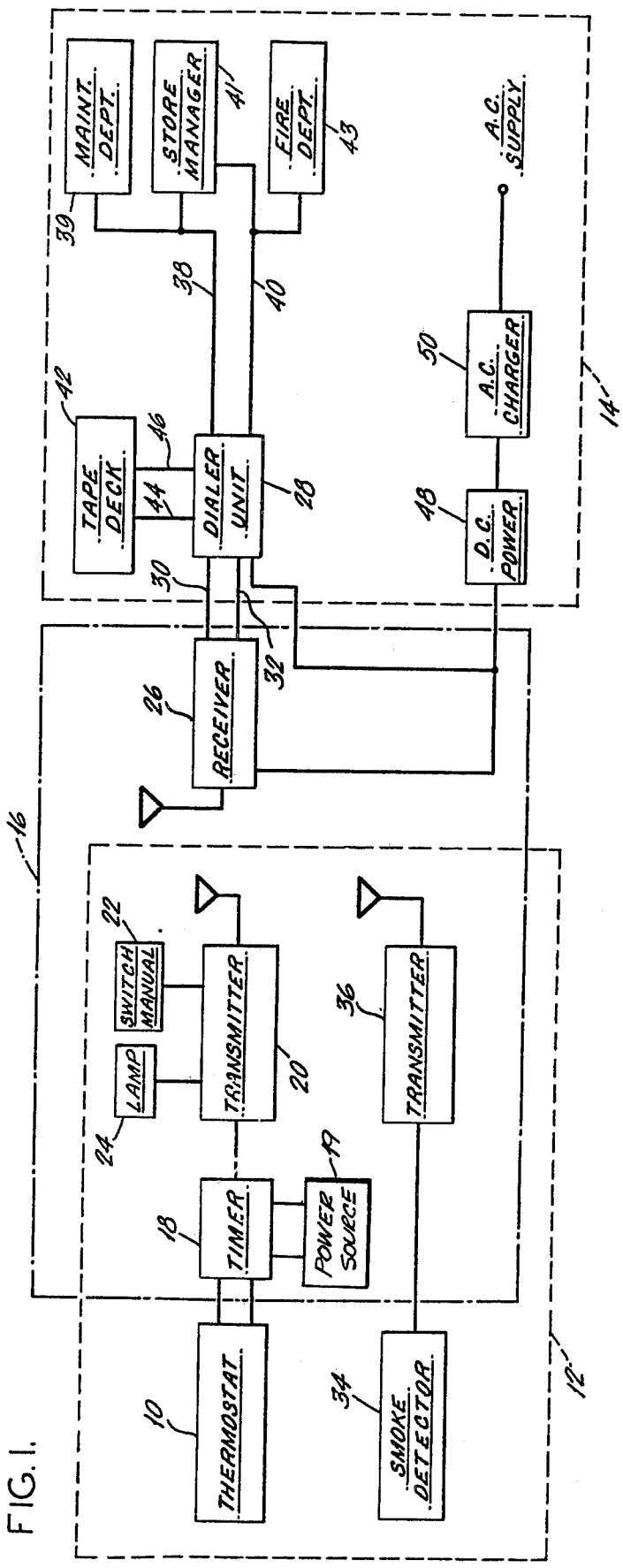

FIG. 1 displays a preferred embodiment of a temperature sensitive alarm system in accordance with the present invention. The system includes a temperature sensing means 10 for directly sensing air temperature in a refrigeration unit 12 and producing an indication when air temperature reaches or exceeds a predetermined level. The system operates a remote alarm means 14 providing a predetermined alarm indicating an abnormal temperature condition in the refrigeration unit 12. Suitable linkage means 16 between the temperature sensing means and the remote alarm means includes timer means 18 actuated by the temperature sensing means when air temperature in the refrigeration unit reaches or exceeds the predetermined level and terminated and reset when the temperature drops below the predetermined level. The timer means provides an actuation signal, or, in effect, does so by allowing such a signal to pass from the temperature sensing means after the timer has been activated continuously for a set period of time. The set period of time may be always the same or may be made to vary under varying conditions affecting a given refrigerator unit.

The timer 18 is an integrated circuit timer preferably of one of the types available commercially and responsive to switch contact operation such as the Signetics 555. In the system shown it is activated by the closing of the thermostat switch of the set point thermostat 10 connected between leads 10a and 10b. The timer 18 also provides alternate reset should the air temperature drop below the critical level. The integrated circuit of the timer makes the system not only compact, but low power. This also makes it possible to provide separate power source 19 in the form of a small cell so that the timer and hence the actuation of the system is not dependent upon the same power system used to power the refrigeration unit being monitored. Hence, power failure in the system supplying the refrigeration means will not cause the alarm system to fail.

The delay period afforded by the timer accommodates periodic defrost cycles during which the air temperature in the refrigeration unit will rise above the specified temperature. The defrost period is shorter than the set delay period, which itself is selected to be considerably shorter than the time required for spoilage of the contents of the refrigeration unit. While the transmitter 20 has been shown within the refrigeration unit, it need not be so confined. However, again integrated circuit technology makes it possible to employ transmitters small enough and possibly inexpensive enough to be used singly within each refrigeration unit. It is also possible to use a number of set point thermostats and associated timers with a common transmitter. Even when this is done, the power levels are so low that any wiring employed may be so light weight that it is barely noticeable. Certainly, this invention makes hard wiring entirely unnecessary.

In one embodiment the timer sets a bistable signal circuit causing the transmitter to transmit. The same circuit may be set by manual depression of a button 22 associated with the transmitter 20. In either event, the transmitter, when activated, transmits a coded RF signal received by a remote radio receiver 26. The transmitter 20 preferably has an indicator lamp 24 which is illuminated when the transmitter is transmitting. This lamp may be used by maintenance personnel to locate the particular transmitter generating the RF alarm signal if multiple transmitters are used in a given location served by the same automatic telephone dial unit. The lamp may also be used to test the operability of the transmitter 9 by a momentary depression of less than one second, of the button 22 as the receiver 26 will not respond to an RF signal of less duration than one second. A transmitter of this type is commercially available from the Multi-Elmac Company.

The remote radio receiver 26 preferably has one or two self-contained relays which, upon receipt of the proper coded signal from a cooperating transmitter for a duration of one second or longer, will close and turn on the dialing unit 28. The receiver preferably is provided with alternative output channels 30 and 32 responsive to different signals from transmitters operating on two different frequencies, for example. Typically, different sensors may be used to monitor not only temperature in refrigeration units but also heat or presence of smoke or gas. For example, smoke sensor 34 connected to transmitter 36 may provide an alternative coded signal receivable by receiver 26 to operate a different signal alarm. The receiver 26 is preferably an optional addition to a larger automatic telephone dialer unit. The receiver may be one commercially available from Multi-Elmac Company. It will be understood, of course, that in a super market, for example, the present invention may be employed in each of the refrigeration units. Conceivably, a common transmitter might be used by a plurality of thermostats with or without means distinguishing signals regenerating in the different location.

The dual track dialer unit 28 contains a dialing mechanism which will dial a pre-programmed telephone number on either of the telephone lines 38 or 40 or still another number if another type of communication system is used. This number may be the telephone number of the receiver 39 in the maintenance department or the telephone number of the receiver 41 of the store manager or any other affected person. The dialing unit 28 has dialing codes, respectively communicating over telephone lines 38 or 40 corresponding respectively to channels 30 or 32. The dialer unit may define a priority to either telephone line. Line 38 may communicate with receiver 39 in the maintenance department while line 40 may contact a telephone receiver 43 in the fire department. Dialer unit 28 includes a dual track magnetic tape player 42 which has channels 44 and 46 connected with telephone lines 38 and 40, respectively. Each channel of the tape includes dialing pulses to sequentially dial the digits of a telephone number. Channel 44 provides pulses for dialing the maintenance department receiver 39 and a recorded message to be delivered, and preferably repeated any selected number of times, to the maintenance department telling them the location of the refrigeration unit which is not functioning. Thereafter channel 44 has dialing pulses to reach the telephone receiver of the store manager 41 and a recorded message about the refrigeration unit. Channel 46 contains dialing pulses for dialing the fire department receiver 43 along line 40 and a message, which may be repeated, giving the location of the fire sensed by smoke detector 34. Then the store manager's receiver 41 is dialed and a recorded message about the fire location repeated several times.

The magnetic tape player does the dialing by recording the sequences of pulses representative of digits in a telephone number, such as one commercially available from the Alarm Device Manufacturing Co.

The remote radio receiver 26, dialing unit 28 and magnetic player unit 42 are all powered by a DC standby power supply 48 commercially available from the Alarm Device Manufacturing Co. This power supply contains an AC trickle charger 50 for keeping a battery continuously charged. The batteries will assure system operation for a long period in the event of AC power failure.

Figure 2:
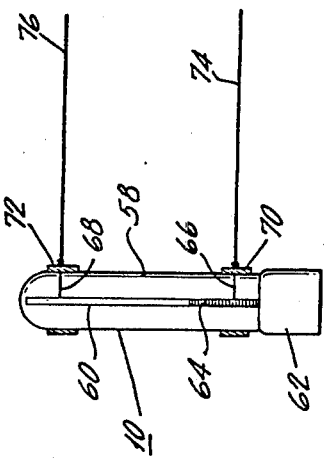

A preferred embodiment of thermostat 10 is shown in FIG. 2. The set point thermostat 10 in FIG. 2 is a thermometer 58 with a bore 60 and bulb 62 containing a column of mercury 64 or other conductive expansible fluid. A pair of conduction leads 66 and 68 are inserted through holes through the glass of the thermometer housing into a bore 60 so that at some predetermined temperature both leads will be immersed in the mercury column thus completing the circuit through the column 64. The set point thermostat 10 can be preset to any temperature where a refrigeration unit may be operable by insertion of the leads so that the second lead is just contacted at the selected temperature. Leads 64 and 66 are preferably connected to bands 70 and 72 around the thermometer in turn connected to external leads 74 and 76. Such a set point thermostat is commercially available from Princo Instruments, Inc. It is to be appreciated that other suitable thermostats, such, for example, as bimetallic snap action thermostats, may also be used. The thermostat 10 is placed in the discharged air of the refrigeration unit to sense the temperature of air entering the product storage section of the refrigeration unit. This has the previously stated advantage of being a direct measurement of air temperature of the refrigeration unit rather than an indirect, inferred indication of air temperature. Thermostat 10 may be located in other portions of the refrigerator unit where the air temperature may be accurately sensed.

The present invention has been described in a preferred embodiment, but it may be clear to those skilled in the art that modifications and variations of this invention are possible within the teaching of this disclosure. All such modifications and variations within the scope of the appended claims are intended to be within the scope and spirit of the present invention.

I claim:

1. An alarm system for a refrigeration unit whose enclosure contains an energy permeable portion, which may be an opening, comprising a temperature sensing means within the refrigeration unit including a switch device effectively employing a change of state of contacts, opening or closing, for directly sensing air temperature in the refrigeration unit and producing an indication when air temperature reaches or exceeds a predetermined level, an integrated circuit timer means containing its own power source independent of a general power source required to operate said refrigeration unit, and directly actuated by the contacts of said temperature sensing means when the air temperature in the refrigeration unit reaches or exceeds the predetermined level and terminated and reset when the temperature drops below the predetermined level, a communication link means employing energy to which said enclosure portion is permeable responsive to said timer means transmitting an actuating signal to initiate the remote alarm means after the timer means has been actuated continuously for a set predetermined time, and remote alarm means responsive to said communication linkage means providing a predetermined alarm indicating an abnormal temperature condition in the refrigeration unit.

2. The alarm system of claim 1 in which the temperature sensing means is a thermometer having a bore and a bulb having good heat exchange characteristics containing an electrically conductive fluid expandable in response to temperature increases, with at least a pair of conductive leads extending into said bore such that at a predetermined temperature level said electrically conductive fluid completes a circuit between said leads and actuates the integrated circuit timer means.

3. The alarm system of claim 1 in which the system employs as the communication linkage means a radio transmitter portion and a receiver portion, with said transmitter portion actuated by said actuating signal and sending a signal to said receiver portion which in response activates said remote alarm means.

4. The alarm system of claim 3 in which the transmitter portion is an RF transmitter suitable for location within or immediately adjacent to the refrigeration unit.

5. The alarm system of claim 4 in which the receiver portion is responsive to different signals from different transmitters for actuating different alarm responses.

6. The alarm system of claim 1 in which the communication linkage means includes an automatic dialing means for dialing a preprogrammed number representing said remote location.

7. The alarm means of claim 1 in which said timer means responds to said changed state of said switch means when said predetermined air temperature level is reached or exceeded and terminated and reset when the temperature falls below the predetermined level and providing an activating signal to initiate the remote alarm means only after the timer has been activated continuously for a set predetermined period of time.

* * * * *